July 27, 1937.   H. J. MICHAELS   2,088,335
INSECT FEEDER
Filed Oct. 16, 1936
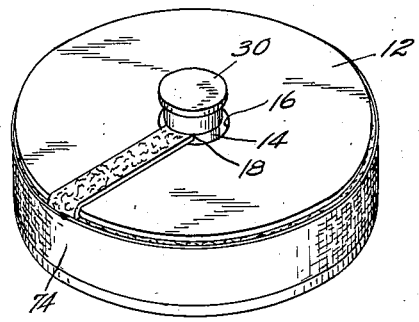
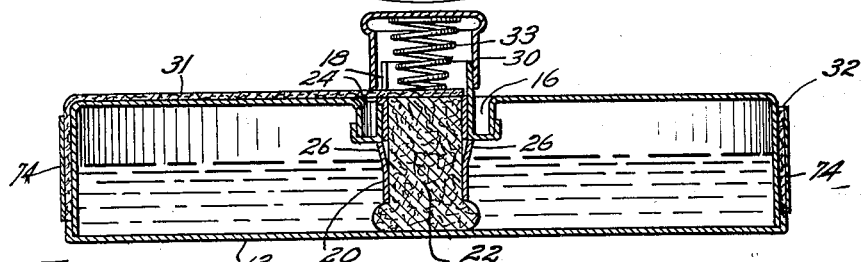
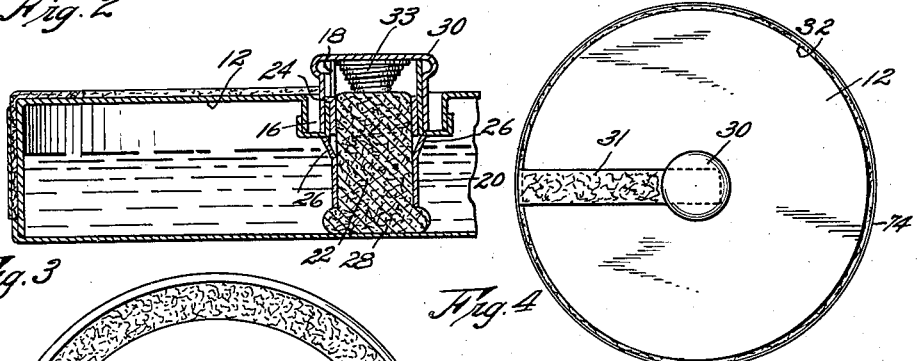
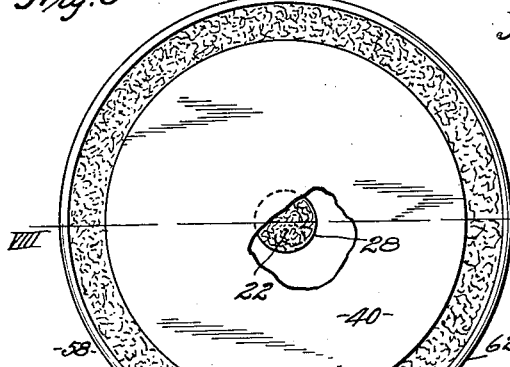
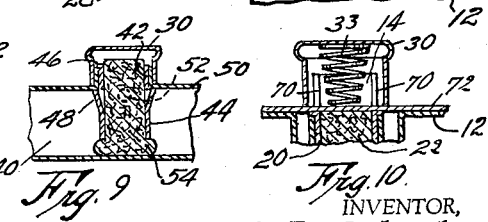
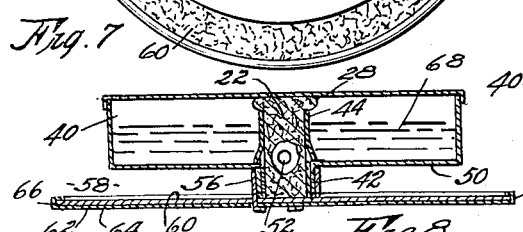
INVENTOR,
Hubert J. Michaels.
BY
Hovey & Hamilton,
ATTORNEYS.

Patented July 27, 1937

2,088,335

UNITED STATES PATENT OFFICE 2,088,335

INSECT FEEDER

Hubert J. Michaels, Gashland, Mo.

Application October 16, 1936, Serial No. 105,897

6 Claims. (Cl. 43—131)

This invention relates to insect feeders wherein liquid is fed from a container to an absorbent pad exteriorly thereof.

The principal object of this invention is the provision of an insect feeder wherein liquid is fed, by novel means, from a container to a pad carried on the outside thereof.

A further object is the production of an insect feeder having effective means whereby liquid is fed from a container regardless of its position relative to the support.

Another object contemplated is the provision of an insect feeder wherein the container is non-refillable.

Other objects and advantages of the invention will appear or be pointed out as the description proceeds.

Reference will now be had to the drawing, wherein:

Figure 1 is a perspective view of an insect feeder embodying this invention.

Fig. 2 is an enlarged, sectional view, taken on line II—II of Fig. 1.

Fig. 3 is a fragmentary, sectional view similar to that shown in Fig. 2, but with the parts in the inoperative position, and cap closing the container.

Fig. 4 is a plan view of the insect feeder.

Fig. 5 is an elevation of the insert and wick detached.

Fig. 6 is a fragmentary, plan view of the container, with the cap removed.

Fig. 7 is a plan view of a modified form of the insect feeder, with parts broken away.

Fig. 8 is a central section, taken on line VIII—VIII of Fig. 7.

Fig. 9 is a fragmentary portion of the container, shown in Figs. 7 and 8, in the upright position with the closure cap in position, and, Fig. 10 is a fragmentary view of a container in which the absorbent tongue passes entirely through the tubular neck.

Like reference characters designate similar parts throughout the several views and the numeral 12 indicates a container or reservoir, preferably made of sheet metal, and adapted to contain a liquid. A tubular filler neck 14 extends upwardly from the bottom of well 16, formed in the top plate of the container, and protrudes thereabove. Said neck is provided at its upper portion with a notch 18 which extends to a point adjacent the plane of top surface of the container and is adapted to receive an absorbent tongue, hereinafter set forth.

An insert 20, which serves as a jacket for wick 22, is adapted to be fitted into neck 14, and has the following means whereby it is secured in position to preclude the refilling of the container. An outwardly extending lip 24, integral with insert 20 at its upper edge, is adapted to be fitted into notch 18 and rest on the bottom margin thereof, while resilient tongues 26, which are compressed as the insert is being inserted, spring to the position shown in Figs. 2 and 3 to engage the bottom wall of the well to preclude upward movement of the insert, thereby making it impossible to remove the insert without distorting or destroying the parts.

It will be noted that the wick 22 is provided with an enlarged head 28 that extends below the lower end of the insert and to the bottom of the container. This enlargement of the wick serves to prevent the removal of the wick through the insert and carries the liquid from the container by capillary action. When positioning the wick and the insert in the assembled container it is necessary to compress head 28 sufficiently to allow it to pass through neck 14.

A closure cap 30 is formed to snugly fit over neck 14 and into the well 16 to seal the container. Mounted on the outer side walls of the container is a band of absorbent material 32. This band is preferably positioned above the bottom of the container so as not to contact the support on which the feeder is placed.

Tongue 31, which is in contact with band 32, is adapted to normally rest on top of the container when in the inoperative position and to pass through notch 16 and rest on wick 22 when in the operative position. To insure proper contact between the tongue and wick, a spring 33, carried by cap 30, is formed to exert a pressure thereon.

Band 32, wick 22 and all the absorbent members of the feeder are made of a suitable material which will, by capillary action, readily absorb a sufficient quantity of liquid from within the container to maintain them in a substantially saturated condition, without a sufficient amount to cause a dripping of the liquid. While many of the absorbent materials might be used in certain of the structures, it has been found by actual use that blotting paper is best suited for general use, and will, by capillary action, quickly saturate all parts of the absorbent material and retain them in a moist condition so long as any liquid remains in the container.

Referring now to Figs. 7, 8 and 9, which show a modified form of the feeder, the container 40, having a tubular neck 42, is adapted to serve as a reservoir for the liquid to be fed to the exposed pads. Fitted into neck 42 is an insert 44, having an outwardly extending lug 46, which serves to contact the upper rim of 42 when the resilient tongues 48 are positioned below the top plate 50 of the container. This insert 44 is provided with openings 52 adjacent the top plate 50, to allow proper feeding of the liquid within the container to the wick 54 positioned within insert 44. This specific type of container is adapted to be inverted and the neck thereof inserted into a tubular member 56, which is securely attached at the center portion of a feed disc 58. When so positioned, as clearly shown in Fig. 8, it will be observed that wick 54 rests on an absorbent member 60, which is fitted into a metal container 62, having a closed bottom 64 and vertical side walls 66. When so positioned with liquid 68 in the container, said liquid will be fed by means of wick 54 to member 60 in sufficient quantities to maintain member 60 saturated. Furthermore, since the container 40 is spaced apart from feed disc 58, a feeding place of seclusion will be afforded the insects. The liquid normally fed to the absorbent member 60 contains an insecticide, which the insect not only eats, but which clings to his feet and is carried into the nest for the extermination of the young.

The modified form shown in Fig. 10 is identical with that shown in the preferred form, with the exception that neck 22 is provided with oppositely disposed notches 70 to accommodate a tongue 72 which extends entirely through the neck in order to feed liquid to the opposite sides of the absorbent band. This construction serves to more readily saturate the band than could be accomplished by a single connection. In all structure shown, the container cannot be refilled since the wick is non-removable and serves as a closure to prevent the inflow of liquid. Furthermore, the insert cannot be removed without destroying the parts.

A thin fabric, such as cheese cloth 74, may serve as a support for band 32, which when moist may have a tendency to sag. The moisture from the band will be sufficiently exposed to the insect through this covering to furnish a proper amount of the liquid to serve its intended purpose.

Having thus described the invention, what is claimed as new and desired to be secured by Letters Patent is:

1. An insect feeder comprising a liquid container having outside vertical walls; a wick positioned in said container and extending outwardly therefrom; an absorbent member positioned outside said container and extending along said outside vertical walls; and means whereby said wick and absorbent member are interconnected to cause a feeding of the liquid from said container.

2. An insect feeder comprising a liquid container; an absorbent member positioned outside the container; a wick positioned within and extending from the bottom to the top of said container; an absorbent connector interconnecting said wick and absorbent member; and means whereby said connector is forced against said wick.

3. An insect feeder comprising a container; a tubular member extending through the wall of said container and having a notch formed in the upper edge thereof; a cap adapted to fit over said tubular member to close said container; an absorbent member carried by said container; a wick extending into said tubular member from within the container; an absorbent connector extending from said absorbent member to said wick; and means carried by said cap to force said connector against said wick.

4. An insect feeder comprising a container; a tubular filler neck extending outwardly from said container; an insert adapted to be projected axially within said tubular neck; means integral with said insert whereby the insert is secured in position in said neck; a wick positioned in said insert and extending to the bottom of said container; and a closure cap for said filler neck.

5. An insect feeder comprising a container; a tubular filler neck extending outwardly from said container; an insert adapted to be projected axially within said tubular neck, said insert having a transverse lug adapted to limit the inward movement of said insert, and a spring tongue carried by said insert to engage the wall of said container to prevent the removal of the insert from said neck; and a wick fixedly positioned in said insert.

6. An insect feeder comprising a container; a well formed in the top wall of said container; a tubular filler neck extending outwardly from the bottom of said wall, spaced-apart from the side wall of said well; a notch formed in the upper edge of said neck; a wick extending through said neck and into said container; a closure cap adapted to fit over said neck and into said well; an absorbent member positioned outside said container; and means whereby said wick and absorbent member may be operatively interconnected.

HUBERT J. MICHAELS.